U. A. GARRED.
FILTER.
APPLICATION FILED MAR. 10, 1913.
1,072,111.
Patented Sept. 2, 1913.
5 SHEETS—SHEET 2.
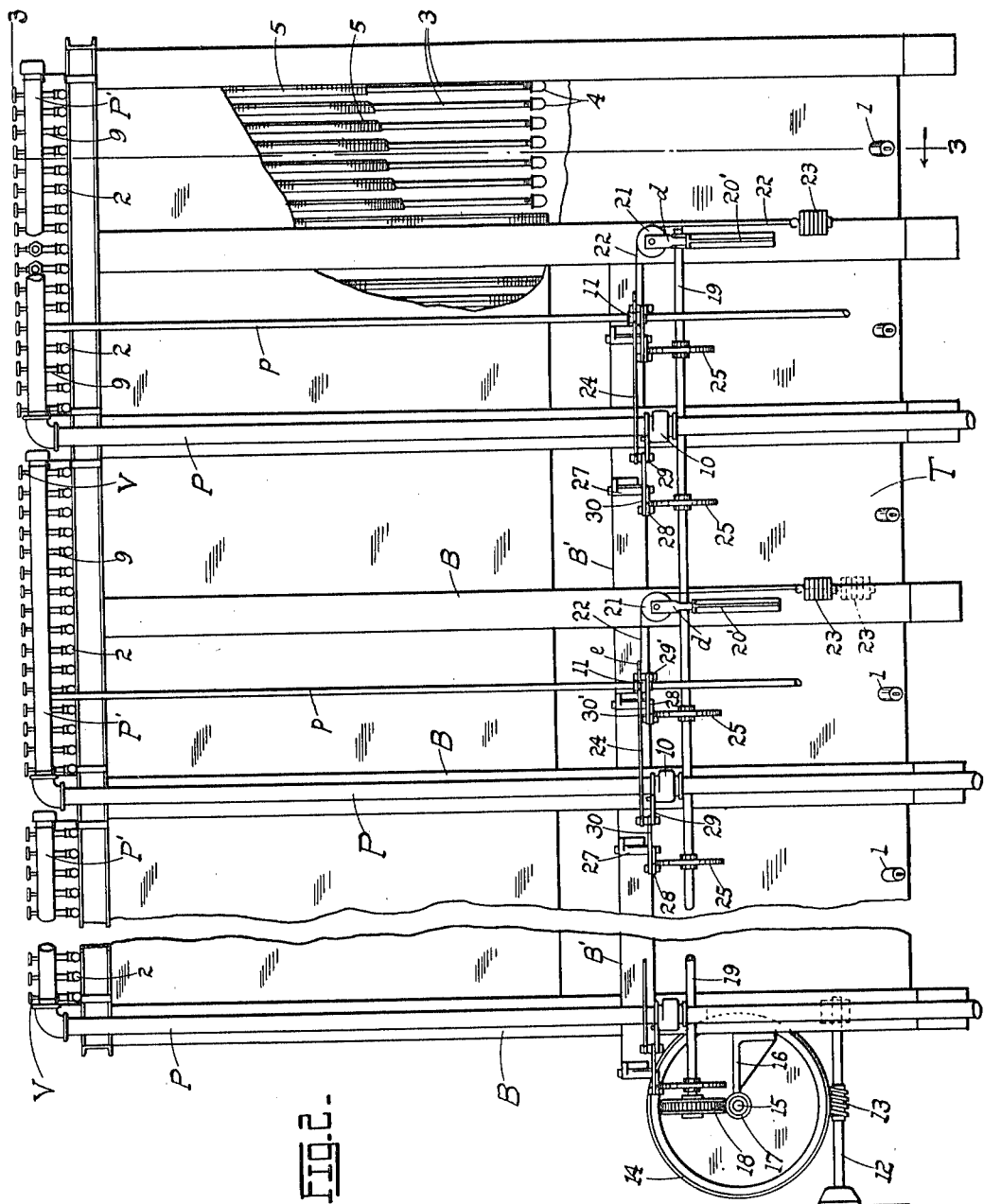
WITNESSES:
INVENTOR.
Ulysses A. Garred
BY
ATTORNEY.

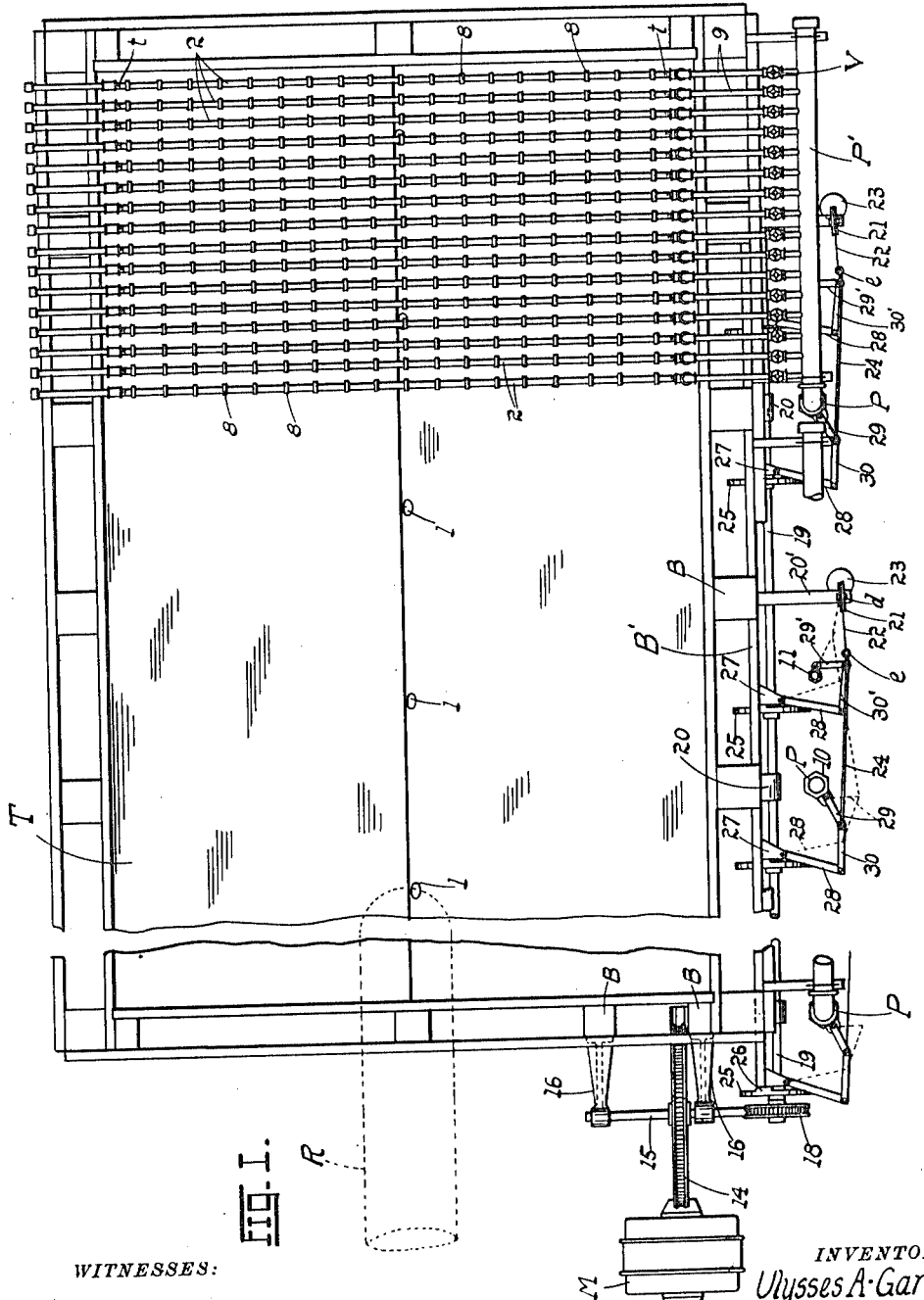

U. A. GARRED.
FILTER.
APPLICATION FILED MAR. 10, 1913.
1,072,111.
Patented Sept. 2, 1913.
5 SHEETS—SHEET 3.
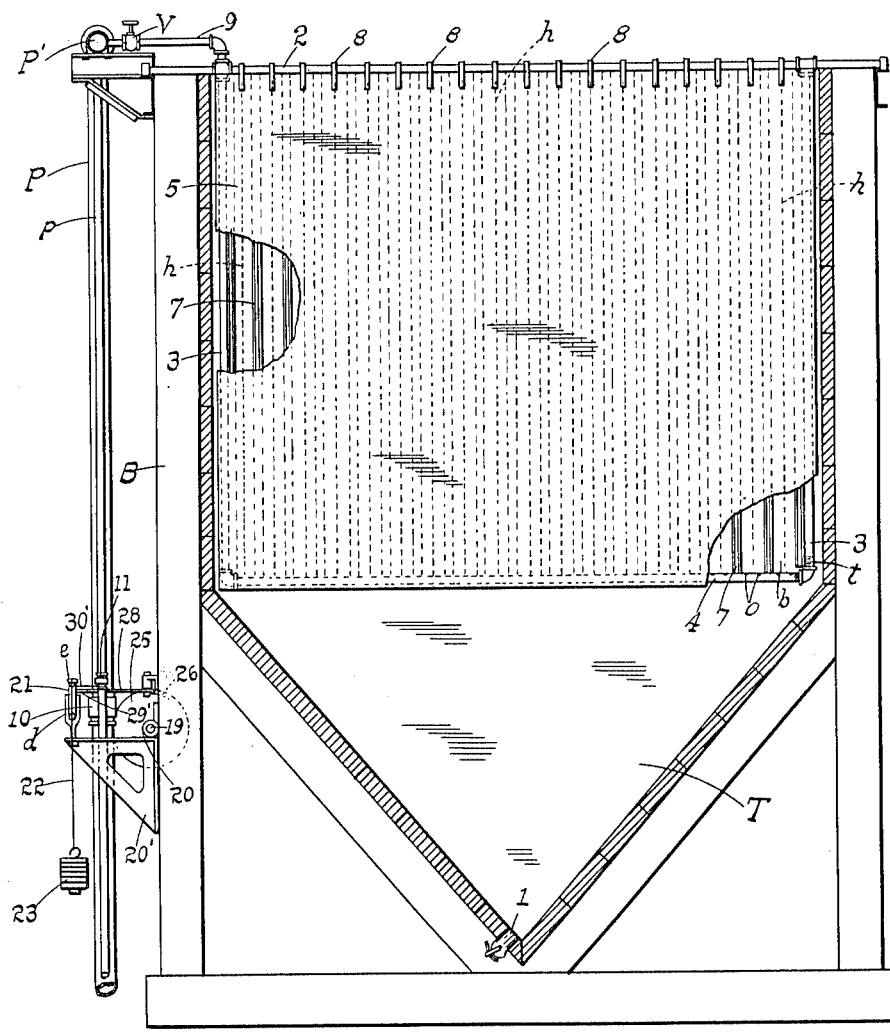
INVENTOR.
Ullysses A. Garred
BY
ATTORNEY.
WITNESSES:

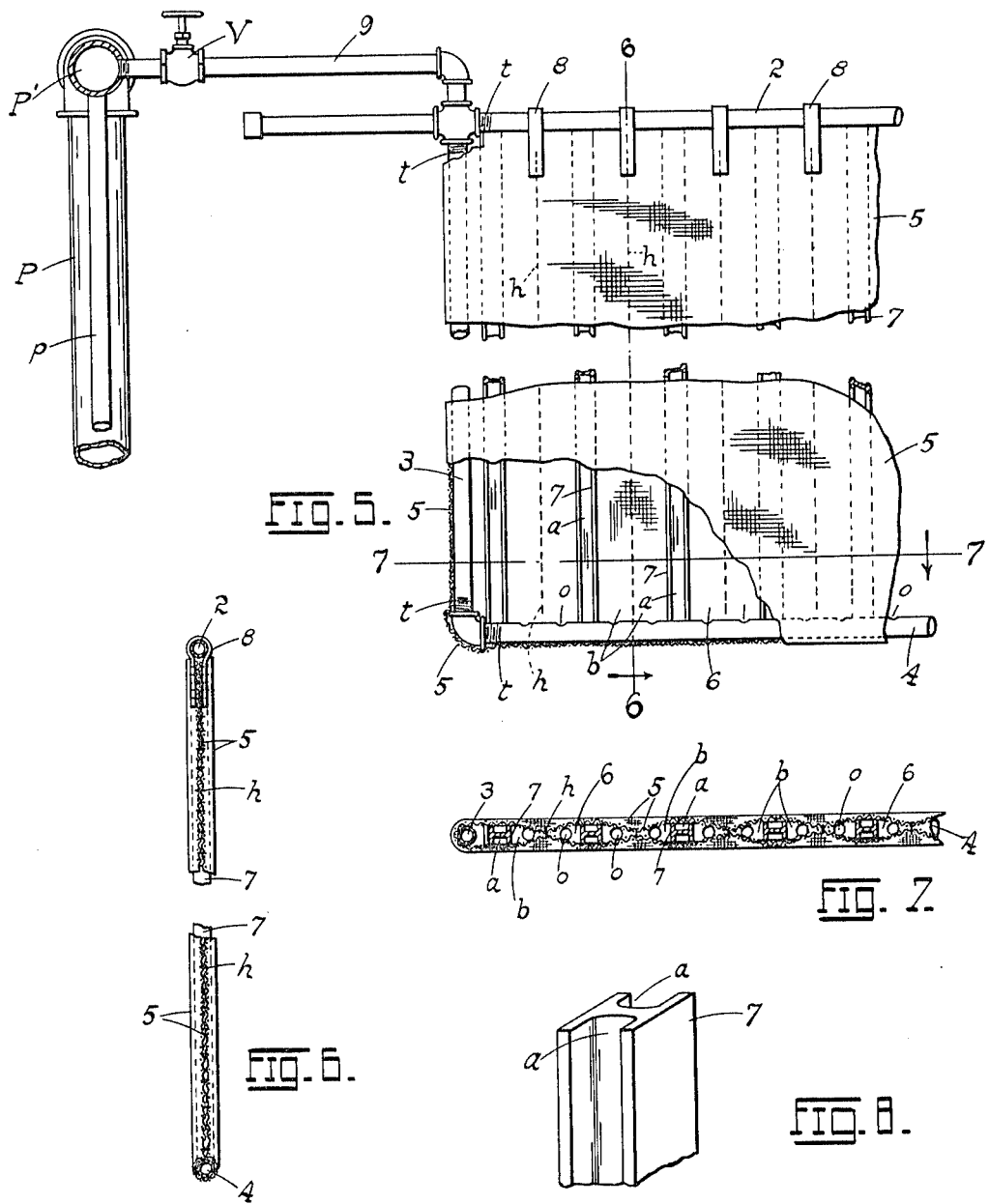

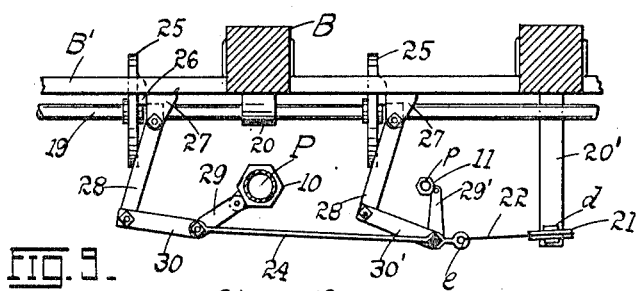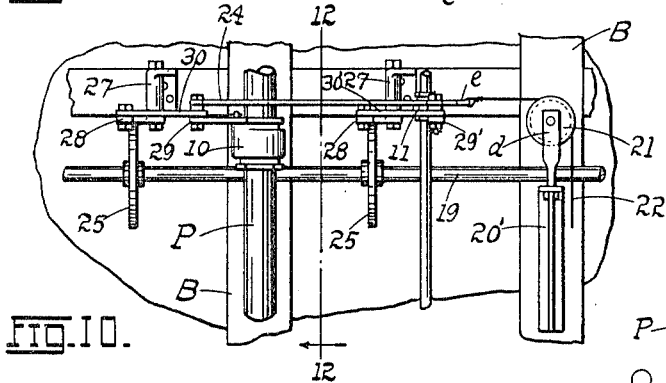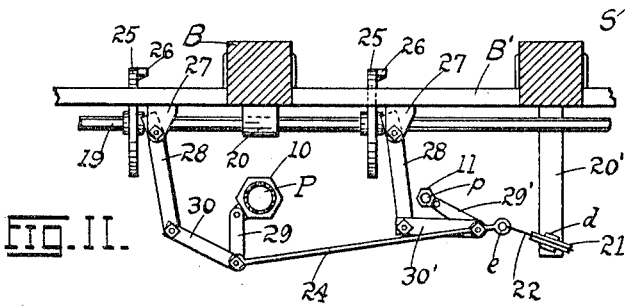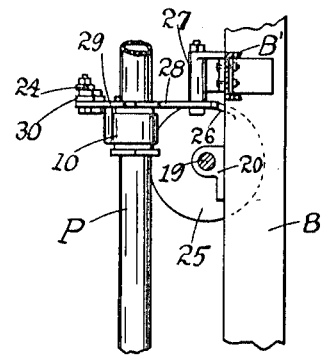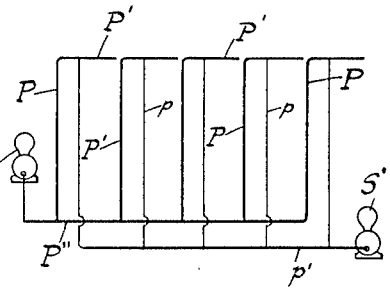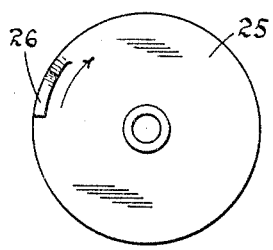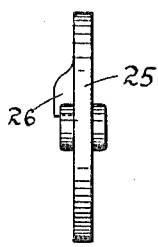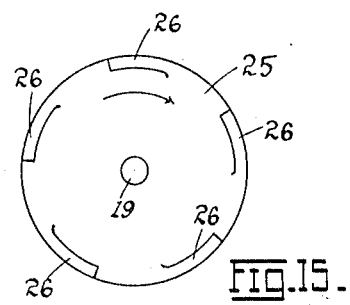

UNITED STATES PATENT OFFICE.

ULYSSES A. GARRED, OF ANACONDA, MONTANA.

FILTER.

1,072,111.  Specification of Letters Patent.  Patented Sept. 2, 1913.

Application filed March 10, 1913. Serial No. 753,364.

*To all whom it may concern:*

Be it known that I, ULYSSES A. GARRED, citizen of the United States, residing at Anaconda, in the county of Deerlodge and State of Montana, have invented certain new and useful Improvements in Filters, of which the following is a full, clear, and exact description, reference being had to the accompanying drawings, forming a part hereof.

My invention has relation to improvements in filter apparatus for dewatering slimes; and it consists in the novel details of construction more fully set forth in the specification and pointed out in the claims.

In the drawings, Figure 1 represents a top plan of my apparatus, showing one battery of filters, the tank being broken, the valves being rocked to washing position; Fig. 2 is a side elevation thereof, with parts broken away; Fig. 3 is a vertical cross-section on the line 3—3 of Fig. 2; Fig. 4 is a diagrammatic top plan showing a tank with five batteries of filters; Fig. 5 is an enlarged face elevation of one of the filters or filter units broken away and with a portion of the outer filter sheet or canvas removed, and showing the pipe connections leading from the inner filter-frame; Fig. 6 is a vertical cross-section on the line 6—6 of Fig. 5; Fig. 7 is a horizontal cross-section on the line 7—7 of Fig. 5; Fig. 8 is a perspective of a portion of one of the stiffening sticks inserted into the pockets of the filter-bag; Fig. 9 is a top plan of the system of links and cam-shaft which control the valves, the parts corresponding to the closed position of the valve in the exhaust pipe, and the open position of the valve in the pressure or cleansing pipe, parts being shown in section; Fig. 10 is a front elevation of Fig. 9; Fig. 11 is a view similar to Fig. 9, showing the parts however, shifted to bring the valve of the exhaust pipe to filtering or open position, and the valve of the cleansing pipe to closed position, said figure and Fig. 9 showing the two extremes occupied by the parts illustrated therein; Fig. 12 is a vertical section on the line 12—12 of Fig. 10; Fig. 13 is a face view of the cam-disk which operates the valve-controlling links; Fig. 14 is an edge view of Fig. 13; Fig. 15 is a diagrammatic projection of the cams of the several pairs of cam-disks identified with the respective batteries of filters; and Fig. 16 is a diagrammatic elevation showing the manner of connecting the filter-frames with the main exhaust and pressure pipes of the system.

The present invention is particularly directed to the partial removal of the water from slimes with a view of thickening the same and putting them in a more suitable form for purposes of concentration. This partial elimination of the water is effected through the instrumentality of a series of filters preferably disposed in "batteries" and suspended in a tank to which the slime is supplied and in which they are submerged, the filtering being accomplished with the assistance of vacuum, or a pressure differential, that is to say, by an excess of atmospheric pressure exerted on one side of the filter over that on the opposite side, the thickened pulp adhering to the filter being periodically washed or dislodged therefrom by a reverse or pressure current so as to keep the filter clean, this method not being broadly claimed, however, because well understood, and old in the art.

The main object herein sought is to provide a system or a series of batteries of filters, the operation of which shall be dependent on a series of automatically controlled valves, each battery having its independent pipe and valves so as to work in cycles or prescribed periods of time, the washing or cleansing period bearing a certain time relation to the filtering period.

A further object is to provide a filter which will not readily clog; one presenting a maximum available surface to the material to be filtered; one which will not collapse; one having a large capacity for water extraction; and one possessing further and other advantages better apparent from a detailed description of the invention which is as follows:

Referring to the drawings, T represents a tank of any convenient length for holding the slimes or equivalent bath (the present one being about thirty feet long), said tank having a bottom which is V-shaped in cross-section as shown, there being distributed at the base of the trough of such bottom a series of discharge plugs 1, for the removal of the thickened pulp. Suspended within the tank above the V-shaped bottom thereof are a series of batteries of filters F, in the present instance there being five batteries with sixteen filters to a battery (see diagrammatic view Fig. 4) although this number may be altered to suit conditions, as fully apparent to the skilled mechanic or operator. The supporting frame of each filter or filter unit comprises a top horizontal strut or pipe 2 resting across the tank, vertical side pipes 3, 3, and a bottom peripherally perforated horizontal pipe 4, any suitable means of coupling the pipes being employed as well understood in the art. This frame is covered over with a bag of duck or canvas 5 (preferably 10 oz. duck) which has vertical seams $h$ sewed at regular intervals, in the present instance two and one-half inches apart (the filter unit being approximately 10 feet by 8 feet), said seams forming between them pockets 6 for the insertion of longitudinally grooved vertical wooden sticks 7, the sticks extending from the pipe 2 to the perforated pipe 4, and serving to keep the canvas taut and prevent its collapse. The cross-section of the stick 7 corresponds in a measure to that of the conventional structural I-beam, the grooves $a, a$, imparting lightness to the stick without impairing its stiffness. The seams $h$ terminate at the top at the bases of the straps 8 which are passed around the pipe 2 and by which the canvas bag or equivalent filtering fabric is secured to the pipe frame. As seen in Figs. 3, 5 and 7, the perforations $o$ in the pipe 4 point upward or into the interior of the filter unit or bag thus formed. It will be seen that the sticks 7 do not completely fill the pockets 6 formed for their reception, there being left between the seams $h$ on each side of a stick, a channel or passage $b, b$, (Fig. 7) to allow the water which is drawn through the fiber of the canvas into the inside of the bag, to follow down along the sticks and enter the holes $o$ in the lower pipe 4 and out through the side pipes 3, 3, into the main header to be presently referred to. The openings $o$ are thus directed into the channels $b, b$, for the purpose just mentioned.

As already pointed out, the pulp or filter tank T is provided with a series of batteries of filters or filter leaves; but since the several filters and batteries, and their controlling means are alike, a detailed description of one will suffice for all. Such a description will therefore be directed to a single battery:—Disposed on the outside of the tank is a vertical header P terminating at the top in a horizontal portion P' (closed at its free end) from which lead a series of branches 9, each branch communicating with the piping of a filter-frame, and being provided with a conventional valve V, whereby any filter may be cut off from the header if desired. The header P is connected to a suction pump S well understood in the art; and in practice the various headers of the several batteries of filters lead to a common main P'' (Fig. 16) which in turn is connected to said suction pump S. The branch P' is tapped by a pressure pipe $p$ of smaller cross-sectional diameter than the pipe P, said pipe $p$ being connected to a suitable force pump S' through a common main $p'$ leading to such pump (Fig. 16), or it may lead to the discharge of the vacuum pump coupled to the pipe P. The precise arrangement is immaterial so long as a suction is exerted on the pipe P and a pressure in the pipe $p$ whereby the pipe P serves to draw the liquid or filtrate from the pulp out of the tank through the filters in one direction, and the pipe $p$ delivers forcible jets (through the openings $o$) into the interior of the filter in the opposite direction to periodically dislodge the solid material which has accumulated on the outside of the filters during the period of enforced or induced filtration.

The pipe P is provided with a 3½ inch "Handy" gate-valve 10, the pipe $p$ being provided with a similar one-inch valve 11, one valve being open while the other is closed, and vice versa. Among the objects sought is to provide means for automatically actuating or controlling these valves whereby the filtering by any battery may proceed through a given period of time, and the washing of the filter through another but relatively shorter period. The mechanism for accomplishing this is as follows: Operated by a motor M positioned opposite one end of the tank is a shaft 12 carrying a worm pinion 13 which meshes with a worm gear 14 on a counter-shaft 15 supported by the brackets 16 secured to the end members of the timbers B which reinforce the tank T, one end of the counter-shaft carrying a worm pinion 17 meshing with a worm-gear 18 at the adjacent end of the cam-shaft 19 supported in bearings 20 secured to the timbers B at the side of the tank. Likewise secured to the side timbers B are brackets 20' each provided with a swiveled fork $d$ carrying a grooved sheave or pulley 21 over which wraps a cable 22 from one end of which is suspended a counter-weight 23, the opposite end of the cable being coupled to the adjacent terminal eye $e$ of a link or connecting rod 24 forming an element of the series of links and arms coupled to the valves 10, 11. Disposed on the shaft 19 is a cam disk 25 having a cam formation 26 (or pin) on one of its faces as shown (the description being confined as above stated to a single battery). Pivotally coupled to a bracket 27 positioned opposite each cam-disk on the channel or equivalent structural member B' is a lever 28 whose short arm or stub is free to sweep within or across the bracket and is slightly bent laterally or out of alinement with the outer long arm, the said stub being normally positioned in the path of sweep of the cam 26 on the disk 25.

The normal position for said lever (in which it is held under the action of the counterweight 23) is indicated by the dotted line in Fig. 1, or more clearly in the large detail in Fig. 11. When however, the cam passes over the stub, the lever is oscillated to the position shown in full in Fig. 1, or in the detail view in Fig. 9 (the counter weight being lifted). There is one controlling lever 28 for each of the valves 10, 11, the valve 10 having a swing-arm 29 coupled through the medium of a link 30 to its lever 28, and the valve 11 having a swing-arm 29' (pointing away from the arm 29) coupled through the medium of a link 30' to its lever 28, the links 30, 30' being in turn connected by the intermediate link or connecting rod 24 previously referred to. It will be seen from the connections described that as the levers 28 are oscillated by the cams 26, the gate valves 10 and 11 will be swung or actuated simultaneously, the valves however, being so set that with such actuation the valve 10 closes while the valve 11 opens, the reverse action taking place when the levers 28 are released from the influence of the cams, in which event the valves are rocked to their first and reverse position under the action of the weight 23 exerting a draft on the cable 22, the valve 10 opening and the valve 11 closing.

The corner connections between the pipes 2, 3, 4, constituting the filter-frame are made by right and left hand threads t, whereby the frame may be expanded at will in the proper direction for tightening the canvas bag or filter 5 as quite obvious from the drawings.

The operation of the filter is substantially as follows:—As pointed out above, each battery of filters is equipped with one vacuum pipe P and a pressure pipe p for respectively inducing forced filtration of the water in the tank T through the filters 5 in one direction, and for delivering water under pressure through the filter walls in the opposite direction to cleanse the filters of accumulations of thickened pulp adhering to their outer surfaces. To effect this result each battery is provided with two valves 10, 11, respectively, the large valve 10 being left open until such time as it may be swung to closed position by the action of its cam on the cam-disk 25, when, as described, the valve 11 is simultaneously swung to open position. As long as the valve 10 remains open, suction will continue through the pipe P, P', drawing the slime water through the filter bag 5 and through the openings o of the filter frame, the solid mater or thickened pulp adhering more or less to the outer surfaces of the filter leaves or bags. When the valve 10 closes, the suction is cut off from the filter, the valve 11 then opening and allowing a cleansing current of water under pressure to pass through the pipes p, P', filter frame and bag in the opposite or reverse direction, thus dislodging the accumulations adhering to the bag and causing them to drop to the bottom of the tank. The quantity of water introduced for cleansing purposes is considerably less than the quantity abstracted during the period of induced filtration, so that the pulp or slime in the tank thickens, and in its thickened condition is allowed to discharge through the bottom of the tank by a removal of the plugs 1. The cam-shaft 19 makes one revolution in twenty-one minutes, the cam 26 remaining in engagement with the stub or short arm of the lever 28 for one minute before it slips off, so that the washing or cleansing operation (under the action of the reverse or pressure current through the pipe p) for any battery of filters lasts through a period of one minute, the period of induced filtration being twenty minutes during which time the valve 10 is open and the valve 11 closed. In the present embodiment of my invention in which I employ five batteries of filters in a single tank, the succession of pairs of cams (there being two cams for each battery since one cam controls a valve 10, the other cam controlling a valve 11) for the successive batteries are so set on the shaft 19 as to bring their cam formations seventy-two (72) degrees apart. Seventy-two being one-fifth of three hundred and sixty (the number of degrees in a complete circle) it follows that although each battery is cleansed once for each revolution of the cam shaft or every twenty minutes, the cleansing of the successive batteries will be every four minutes, five going into twenty, four times. Thus for each cycle or single revolution of the cam-shaft there will be a cleansing or washing operation or dislodgment of accumulations from the filter bags every four minutes, each cleansing lasting one minute, the balance of the time being consumed in filtering (a period of twenty minutes for each battery). The angular disposition of the cams relatively to one another is illustrated in the diagrammatic view in Fig. 15, said figure showing a projection of the cams of the several pairs of cam-disks, about the axis of rotation of the cam-shaft, and substantially seventy-two degrees apart. The object in operating the cams in pairs (one controlling the valve 10 and the other controlling the valve 11) is because a single cam, say the one actuating the lever 28 coupled to the valve 10 if used alone, would impose too great a strain on the shaft 19, and on the various links connecting the valves together and to the counterweight 23.

The number of filters or units to a battery, is of course, immaterial; so too, may the number of batteries to a tank be varied, in which event the angular disposition of the cams (about the axis of the shaft 19) relatively to one another would be acordingly changed. The tank T too, may be of any length and operated in sections, having one battery of filters washing while the others are filtering, thus giving at all times clean filters and getting the greatest capacity of water extraction. To vary the degree of thickening of the pulp, the suction exerted through the pipe P may be so regulated as to induce a flow of water through the filters at any rate of speed; or with a given vacuum-pressure exerted by the pipe P, any desired pressure may be imposed on the reverse current through the pipe $p$, so that the consistence of the thickened pulp which finally flows through the openings closed by the plugs 1 may be controlled to a nicety.

The apparatus may be changed as to details without a departure from the spirit of my invention.

R represents the pulp feed-pipe or conduit discharging into the tank, being shown here dotted as its position may be shifted to suit the operator. The tank T may of course, be supplied with pulp in any other way known to the art.

It will be noticed from the foregoing that no movement is imparted to the filters or filter frames to effect manipulation of the valves which control the currents traversing said filters. In other words, the filters are stationary, and the term "stationary" as employed in the claims is to be construed in the sense here indicated. For it is obvious that occasions may arise where for one reason or another a movement may be imparted to the filters while within the tank, for some specific purpose; but if the movement is such as not to affect the valves, the filter is still to be regarded as "stationary" in the sense used in the present application. The filter moreover is permanently immersed in the liquid to be filtered, a removal of the filter out of the tank not being herein contemplated.

Having described my invention, what I claim is:—

1. In combination with a tank containing slimes to be filtered, a stationary filter submerged in the liquid in the tank, means for inducing a flow of the filtrate from the tank through the filter in one direction by a differential in pressure between the opposite sides of the filter, a conducting pipe for the filtrate, a valve in said pipe, a second pipe contiguous to the first pipe for conducting a cleansing current to and through the filter in the opposite direction, a valve for said pipe, a cam-shaft, and intermediate connections between said shaft and valves and between the respective valves for automatically closing the valve of the filtrate-conducting pipe and simultaneously opening the valve of the pipe conducting the cleansing current, for the purpose set forth.

2. In combination with a tank adapted to contain slime to be thickened, a filter in the tank, means for drawing the filtrate from the tank through the filter, a rotatable shaft, a cam on said shaft operating to effect a discontinuance of the filtering current during the passage of the cam through a prescribed length of arc of the circle described thereby, means for automatically directing a reverse current through the filter during the period of discontinuance of the filtering current, the arc described by the cam during the action of the reverse current being shorter than that described during the action of the filtering current, whereby the contents of the tank is gradually thickened.

3. An apparatus for dewatering slimes comprising a tank, a series of batteries of stationary filters immersed in the liquid in the tank, an exhaust pipe for drawing a filtering current through the filters in one direction, a second pipe contiguous thereto for delivering a current under pressure for washing the filters, a valve in each pipe for controlling the flow of the liquid therethrough, a rotatable cam-shaft mounted adjacent the tank, cams disposed in pairs about said shaft, and placed in coöperative relation to the respective batteries and at predetermined angular distances apart around the axis of the shaft, according to the number of batteries in the tank, controlling levers adapted to be actuated in one direction by the respective cams with the rotation of the shaft, arms leading from the valves, the valve of the exhaust pipe being set to close while that of the pressure pipe opens, links connecting the valve-arms to the corresponding controlling levers, a connecting rod connecting together the lever arms to which the links are secured, a counter-weight, a sheave, a cable coupled to the weight and passing over the sheave and secured at one end to the connecting rod, the parts operating substantially as set forth.

In testimony whereof I affix my signature, in presence of two witnesses.

ULYSSES A. GARRED.

Witnesses:
M. E. RUTLEDGE,
E. P. MATHEWSON.